(12) United States Patent
Huard et al.

(10) Patent No.: US 10,994,577 B2
(45) Date of Patent: May 4, 2021

(54) METHOD FOR CORRECTING THE MEASURED PRESSURE IN A TIRE

(71) Applicants: Continental Automotive France, Toulouse (FR); Continental Automotive GmbH, Hannover (DE)

(72) Inventors: Jean-Charles Huard, Toulouse (FR); Nicolas Guinart, Toulouse (FR)

(73) Assignees: Continental Automotive France; Continental Automotive GmbH

(*) Notice: Subject to any disclaimer, the term of this patent is extended or adjusted under 35 U.S.C. 154(b) by 40 days.

(21) Appl. No.: 16/488,685

(22) PCT Filed: Mar. 15, 2018

(86) PCT No.: PCT/FR2018/050625
§ 371 (c)(1),
(2) Date: Aug. 26, 2019

(87) PCT Pub. No.: WO2018/189440
PCT Pub. Date: Oct. 18, 2018

(65) Prior Publication Data
US 2020/0384816 A1   Dec. 10, 2020

(30) Foreign Application Priority Data

Apr. 10, 2017 (FR) ...................................... 1753112

(51) Int. Cl.
*B60C 23/04* (2006.01)
*B60C 23/20* (2006.01)
*G05B 15/02* (2006.01)

(52) U.S. Cl.
CPC ...... *B60C 23/0477* (2013.01); *B60C 23/0488* (2013.01); *B60C 23/20* (2013.01); *G05B 15/02* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS

| 5,900,809 A | 5/1999 | Hebert |
| 8,035,501 B2 | 10/2011 | Fink et al. |
| 8,712,629 B2 * | 4/2014 | Vassilieff ............ B60C 23/0481 701/30.3 |

FOREIGN PATENT DOCUMENTS

| DE | 10221723 A1 | 12/2003 |
| FR | 2680135 A1 | 2/1993 |

(Continued)

OTHER PUBLICATIONS

English Translation of Written Opinion for International Application No. PCT/FR2018/050625, dated Jun. 22, 2018, 6 pages.
(Continued)

*Primary Examiner* — Andre J Allen
(74) *Attorney, Agent, or Firm* — RatnerPrestia

(57) ABSTRACT

A method for determining the pressure of a tire of a vehicle being driven at a speed, the tire comprising, arranged in the tire, a pressure sensor and a temperature sensor. The method includes generating a library of ratios between a measurement of the output of the pressure sensor and a measurement of the output of the temperature sensor, the one or more ratios being calculated at different speeds and one ratio being measured at a speed of zero, defining a variation law representative of the variation in the ratios with respect to the acceleration experienced by the pressure sensor, measuring the output of the pressure sensor and the output of the temperature sensor, and obtaining the value of the acceleration experienced by the pressure sensor, and determining the pressure by correcting this measurement with the variation law.

10 Claims, 2 Drawing Sheets

(58) Field of Classification Search
CPC .... G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
USPC .................................................. 73/146–146.8
See application file for complete search history.

(56) References Cited

FOREIGN PATENT DOCUMENTS

| | | |
|---|---|---|
| FR | 2913371 A1 | 9/2008 |
| WO | 2008119524 A1 | 10/2008 |

OTHER PUBLICATIONS

International Search Report and Written Opinion for International Application No. PCT/FR2018/050625, dated Jun. 22, 2018—8 pages.

* cited by examiner

METHOD FOR CORRECTING THE MEASURED PRESSURE IN A TIRE

CROSS REFERENCE TO RELATED APPLICATIONS

This application is the U.S. National Phase Application of PCT International Application No. PCT/FR2018/050625, filed Mar. 15, 2018, which claims priority to French Patent Application No. 1753112, filed Apr. 10, 2017, the contents of such applications being incorporated by reference herein.

FIELD OF THE INVENTION

The invention relates to the field of monitoring of tires and more particularly relates to a method for measuring the pressure of a tire. The invention proposes to decrease error in the measurement of the pressure of a tire.

BACKGROUND OF THE INVENTION

Sensors may be integrated into one or more application-specific integrated circuits (ASICs) carried by a printed circuit board (PCB) in order to measure properties of the tires of a vehicle whilst it is being driven.

In particular, the tires of a vehicle may comprise a tire pressure monitoring system (TPMS) for example allowing a leak rate to be detected.

The TPMS may be direct, i.e. one or more sensors may be arranged in the cavity of the tire. The measurements are carried out directly in the cavity then transmitted to a centralized processor of the vehicle, where they are processed.

The system incorporated into the cavity of the tire may comprise other sensors, such as a temperature sensor and/or an accelerometer. It may be arranged on the valve for inflating the tire, adhesively bonded under a tread in the cavity of the tire, and/or fastened to the wheel rim inside the tire.

Patent application FR 2913371, incorporated herein by reference, describes a system allowing the pressure of each of the tires of a vehicle to be measured independently while it is being driven. For each wheel, a system comprising a sensor, for example integrated into the rubber of the tire, allows information to be transmitted to a receiver by means of a radiofrequency emitter. Each receiver is arranged in proximity to the wheel with which it is associated and connected by a bus to a control device, comprising a central processor. The measured and transmitted data may then be analyzed, for example in order to be presented to the user of the vehicle.

Pressure sensors generally have a sensitivity that is dependent on acceleration, i.e. the signal output from the sensor is representative of both of two variables: the pressure in the cavity of the tire and the acceleration of the pressure sensor.

In particular, the sensitivity to acceleration of the pressure sensors that are generally used is for example 4 Pa/g. Considering a speed of the vehicle of 130 km/h and the radius between the sensor and the center of the wheel, the acceleration may be equal to 350 g. Such an acceleration leads to a variation of 1.4 kPa measured by the pressure sensor. Generally, the variations caused by the acceleration of the pressure sensor do not correspond to an actual variation in pressure in the cavity of the tire, and limit the precision of a pressure measurement carried out while the vehicle is being driven.

SUMMARY OF THE INVENTION

One aim of an aspect of the invention is to provide a method allowing errors in the measurement of the pressure of a tire, and in particular an error caused by the acceleration of the pressure sensor, to be decreased or even prevented. More generally, one aim of an aspect of the invention is to characterize this measurement error. Another aim of an aspect of the invention is to estimate the acceleration of a pressure sensor from measurements carried out by this sensor.

These aims are achieved in the context of aspects of the present invention by virtue of a method for determining, at a time t, the pressure of a tire of a vehicle that is being driven at a speed v, the tire comprising, arranged in the tire, a pressure sensor and a temperature sensor, comprising steps consisting in:

a) generating a library of ratios between a measurement of the output of the pressure sensor and a measurement of the output of the temperature sensor, the one or more ratios being calculated at different speeds v and one ratio being measured at a speed v of zero, b) based on the ratios of the library, defining a variation law representative of the variation in the ratios with respect to the acceleration experienced by the pressure sensor, c) at the time t, measuring the output of the pressure sensor and the output of the temperature sensor, and obtaining the value of the acceleration experienced by the pressure sensor,
   determining the pressure by correcting this measurement with the variation law.

Advantageously, in step a) of the method, the library is updated with ratios measured during a first phase of driving and step c) follows steps a) and b).

Advantageously, the first phase of driving has a duration of ten minutes.

Advantageously, in step a), a ratio is measured at a speed v comprised between 50 km/h and 100 km/h and another ratio is measured at a speedy strictly comprised between 100 km/h and 150 km/h.

Advantageously, the acceleration of the pressure sensor is obtained in step c) with an accelerometer arranged in the tire.

Advantageously, the acceleration of the pressure sensor is obtained in step c) with an element chosen from a speed sensor of a wheel associated with the tire and a GPS system of the vehicle.

Advantageously, it is checked that the norm of the variation of a ratio is lower than 8 $Pa \cdot K^{-1} \cdot s^{-1}$ before step c) and preferably lower than 6 $Pa \cdot K^{-1} \cdot s^{-1}$.

Advantageously, it is checked that the variation in the output of the temperature sensor is comprised between −1 and 1 $K \cdot min^{-1}$ before step c).

Advantageously, the value of the acceleration of the pressure sensor is obtained in step c) by:

d) sampling values of the output of the pressure sensor during a preset period;

e) determining the frequency of the variations in the values measured in step d);

f) calculating the acceleration of the pressure sensor depending on the frequency measured in step e) and on the radius between the pressure sensor and the center of the wheel.

Advantageously, the frequency is determined in step e) using a method chosen from a Fourier transform, a maxima analysis and an analysis of the rate of change of sign.

BRIEF DESCRIPTION OF THE DRAWINGS

Other features and advantages will become clearer from the following description, which is purely illustrative and nonlimiting, and which must be read with reference to the appended figures, in which.

DETAILED DESCRIPTION OF THE PREFERRED EMBODIMENTS

Figure 1:
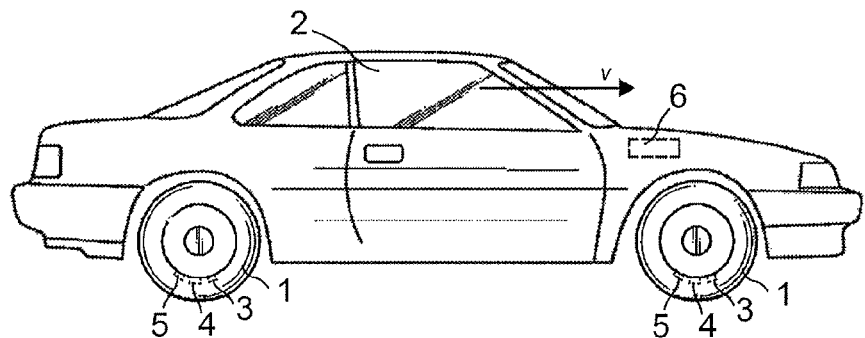
FIG. 1 schematically illustrates a profile view of a vehicle being driven.

FIG. 1 schematically illustrates a profile view of a vehicle 2 being driven, which vehicle is equipped with a tire pressure monitoring system (TPMS). The fact that the vehicle is being driven at a speed v is illustrated by a horizontal vector v.

The vehicle 1 comprises a plurality of wheels, and each wheel is equipped with a tire 1. Two wheels 1 are illustrated in FIG. 1. One tire comprises at least one measuring system, allowing the pressure in the tire to be measured, preferably in the cavity of the tire. This system may comprise an ASIC system mounted on a PCB. A measuring system may for example be securely fastened to the rim of the wheel so as to be arranged in the interior of the casing of the tire. A measuring system may be supplied with power by a battery, which supplies the system with power throughout its lifetime.

The measuring system comprises a pressure sensor 3, which is arranged in the tire and preferably partially in the cavity of the tire. It has been drawn with dashed lines in FIG. 1. The pressure sensor may be arranged on and/or in the tread. As a variant, the pressure sensor may be arranged on the valve of the tire.

The measuring system may also comprise an accelerometer 5 and/or a sensor 4 of temperature T, which sensor has been drawn with dashed lines in FIG. 1.

The vehicle also comprises a central unit 6. The central unit comprises a centralized processor and a memory. The central unit 6 may also comprise a radiofrequency receiver.

The one or more measuring systems of a vehicle may be connected and identified as described in patent application FR 2974033, incorporated herein by reference. The data measured by the measuring system integrated into each wheel may be transmitted by radio frequency to the central unit 6.

Figure 2:
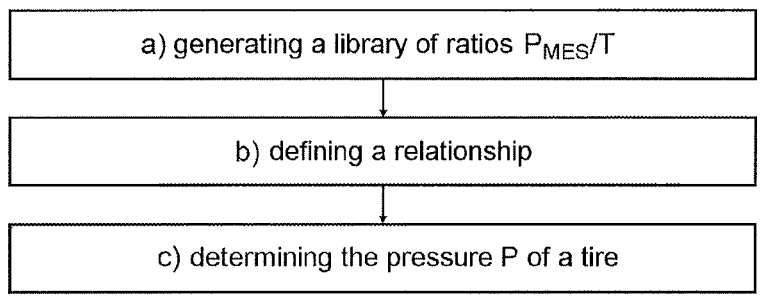
FIG. 2 illustrates a method for determining the pressure of a tire.

FIG. 2 schematically illustrates a method for determining the pressure P of a tire. The measured value of the output of a pressure sensor, $P_{MES}$, comprises an error, caused by the sensitivity of the pressure sensor to acceleration.

In step a) of the method illustrated in FIG. 2, a library of ratios $P_{MES}/T$ between a measurement $P_{MES}$ of the output of the pressure sensor and a measurement of the output of the temperature sensor is generated: a plurality of measurement pairs ($P_{MES}$,T) are formed at various times and at various speeds v the of the vehicle. These measurements are transmitted to the central unit 6. They may be recorded in the memory of the central unit 6. For each measurement pair, a ratio $P_{MES}/T$ is calculated and recorded in the memory of the central unit 6 so as to form a library of ratios $P_{MES}/T$. If the library comprises a limited number of ratios, step b) may consist in updating the library.

Generally, at least one pair of measurements corresponds to a speed v of zero. Thus, the acceleration of the pressure sensor, which is lower than or equal to 1 g, does not lead to an error in the measured pressure $P_{MES}$.

Two ratios $P_{MES}/T$ may preferably be chosen in ranges of vehicle speed v allowing common speeds v to be covered. Preferably, a ratio $P_{MES}/T$ is measured at a speed v comprised between 50 km/h and 100 km/h, and another ratio $P_{MES}/T$ is measured at a speed v strictly comprised between 100 km/h and 150 km/h. Steps a), b) and/or c) of the method need not be carried out during the same period of driving. The library is not necessarily integrally recalculated during each period of driving: all or some of the ratios therein may be the ratios measured and calculated in preceding periods of driving. A library may for example comprise a number of fixed ratios, the ratios being updated in a step a). The ratios may also be updated depending on their date and/or time of computation. Generally, the library comprises at least three ratios, one of the ratios corresponding to a measurement carried out at a zero vehicle speed. Each ratio of a library may also correspond to a range of acceleration of given size or width: for ranges of a width of 50 g, one ratio is measured between 0 g and 49 g, one ratio is measured between 50 g and 99 g, etc. Information received by other sensors of the vehicle may also influence the measurements of ratio during a period of driving and/or the use, in the library, of ratios that existed before the period of driving.

In step b) of the method illustrated in FIG. 1, a variation law, representative of the variation in the ratios with respect to the acceleration of the pressure sensor, is defined. During a period of driving, the acceleration of the pressure sensor may be a radial acceleration. This variation law may correspond to a function dependent on the acceleration of the pressure sensor and on at least one fitting parameter. The variation law for example corresponds to an affine function, the slope being the fitting parameter considered for this function. Other functions may be used, such as a (preferably linear, quadratic or third-order) polynomial function.

In one embodiment of an aspect of the invention, the central unit 6 of the vehicle may adjust the one or more parameters of the variation law so as to decrease the discrepancy between the variation law and the ratios recorded in the library of ratios. This discrepancy may be minimized by various methods, and preferably by the least-squares method.

Ratios corresponding to accelerations different from those of the ratios measured in step a) are loaded, by a processor of the central unit, in order to define a variation law more representative of the variation in the ratios depending on the acceleration of the pressure sensor.

Advantageously, steps a) and/or b) of the method illustrated in FIG. 2 are carried out during a first phase of driving the vehicle, preferably during the first ten minutes of driving the vehicle. During this first phase of driving the vehicle, various ratios may be measured and/or computed for accelerations of the pressure sensor corresponding to conventional speeds, and preferably to speeds comprised between 0 km/h and 150 km/h. The ratio corresponding to a speed v of zero is for example measured and computed before the vehicle is started up.

In step c) of the method illustrated in FIG. 2, the output $P_{MES}$ of the pressure sensor and the output T of the temperature sensor are measured at a time t, while the vehicle is being driven. At the same time t, the acceleration of the pressure sensor is obtained or computed. Next, a ratio $P_{MES}/T$ is computed. Thus, it is possible to determine the pressure P of the tire by correcting the pressure $P_{MES}$ measured in step c) with the variation law determined in the preceding step b). For example, if the variation law corresponds to a function f, dependent on a single fitting parameter A computed in step b), it is possible to compute the pressure in the following way: $P = P_{MES} - f(v, A)$.

The central unit of the vehicle may take into account brief stops of the vehicle so as to avoid starting the method from step a) after each stop. Thus, if the vehicle is stopped during step c) of the method and for a time shorter than a preset time stored in the memory of the central unit, fifteen minutes for example, the method continues directly from step c) when the vehicle continues on its way.

It may be necessary for a plurality of conditions to be met to pass from step b) to step c) of the method illustrated in FIG. 2.

While the vehicle is being driven, the ratio $P_{MES}/T$ is sampled. It is possible to distinguish between a leak in the tire and the sensitivity of the pressure sensor to acceleration. Generally, and under good driving conditions, i.e. when the tire is not leaking, the ratio $P_{MES}/T$ varies less than when the tire is leaking: the variations in $P_{MES}$ as a function of speed (or of the acceleration of the pressure sensor) of the vehicle may for example make this ratio vary. The central unit of the vehicle measures the variations over time in this ratio: if the norm of this variation exceeds a preset threshold recorded in the central unit, a leak may be detected. In contrast, if the norm of the variations in the ratio $P_{MES}/T$ do not exceed this threshold during a preset period:

pairs ($P_{MES}$, T) may be measured so as to generate a library of ratios (in step a) of the method);
the pressure P of the tire may be determined in step c) of the method illustrated in FIG. 2.

It is possible to check that the norm of the variation over time in the ratio is lower than $8 \text{ Pa} \cdot K^{-1} \cdot s^{-1}$.

Similarly, a preset temperature threshold may be stored beforehand in the memory of the central unit: if the norm of the variation in the temperature measured in the tire does not exceed a preset threshold during a preset period, the central unit may determine the pressure P of the tire in step c) of the method illustrated in FIG. 2. It is possible to check whether the variation over time in the output of the temperature sensor is comprised between $-1 \text{ K} \cdot \text{min}^{-1}$ and $1 \text{ K} \cdot \text{min}^{-1}$, and preferably between $-0.65 \text{ K} \cdot \text{min}^{-1}$ and $0.65 \text{ K} \cdot \text{min} - 1$.

Generally, in step a) and/or b) and/or c) of the method illustrated in FIG. 2, the speed v of the vehicle may be computed by determining the acceleration of a point on the wheel, in particular the acceleration of the pressure sensor. In step c), it is possible to obtain the value of the acceleration of the pressure sensor with an accelerometer arranged in the tire. The acceleration of the pressure sensor may also be measured using a speed sensor arranged in the wheel (used for example by an ABS system of the vehicle, arranged in proximity to the wheel). The GPS system of the vehicle may also be used to measure the speed of the vehicle and to deduce therefrom the acceleration of the pressure sensor, the arrangement of the sensor in the wheel being known beforehand.

Figure 3:
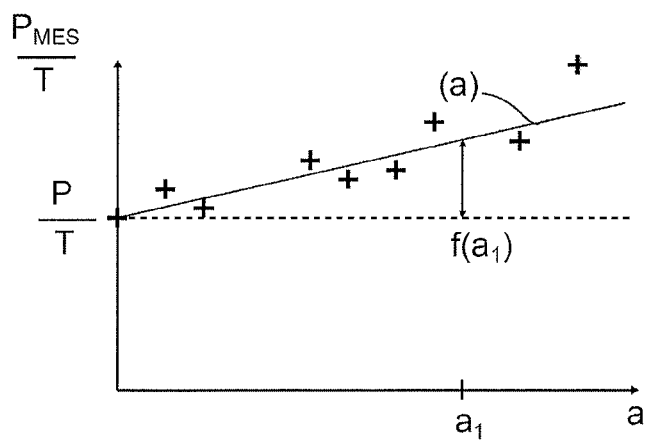
FIG. 3 schematically illustrates the variation in a ratio $P_{MES}/T$ between a measurement of the output of the pressure sensor and a measurement of the output of the temperature sensor.

FIG. 3 schematically illustrates the variation in a ratio $P_{MES}/T$ between a measurement $P_{MES}$ of the output of the pressure sensor and a measurement T of the output of the temperature sensor. The dashed line schematically illustrates the ratio between the actual pressure P in the tire, and the temperature T measured by the temperature sensor. Such a ratio P/T varies in a substantially constant manner with an increase in acceleration. The crosses illustrate various ratios $P_{MES}/T$ measured and/or computed in phase a) of a method: they for example illustrate the ratios of the generated library. Curve (a) of FIG. 3 schematically illustrates a variation law representative of the variation in the ratios with the acceleration a experienced by the pressure sensor. This variation has a component corresponding to the pressure P/T, which remains constant, and a component corresponding to the function f. The double arrow illustrates a value of the function f for an acceleration equal to $a_1$. The variation law defined in step b) of the method corresponds in this example to an affine function.

Figure 4:
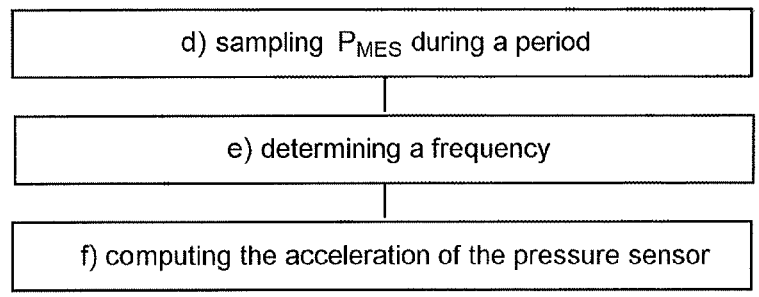
FIG. 4 illustrates a method for determining the acceleration of a pressure sensor.

FIG. 4 illustrates a method for measuring the acceleration of a pressure sensor.

In step d) of the method illustrated in FIG. 4, values of the output $P_{MES}$ of the pressure sensor are measured or sampled during a predefined period. The period is for example chosen to be between 10 ms and 1 s and preferably chosen to be between 100 ms and 500 ms. The sampling is carried out at a frequency higher than 50 Hz, and preferably at a frequency higher than 125 Hz and lower than 1000 Hz.

In step e) of the method illustrated in FIG. 4, the central unit 6 analyzes the measurements carried out in step d) so as to determine whether the vehicle is being driven and so as to determine the speed v of the vehicle. The variations in the measurements carried out in step e) are analyzed by the central unit 6: if a sinusoidal pattern is recognized, it is determined that the vehicle is being driven. If no sinusoidal pattern is recognized by the central unit 6, the vehicle is not being driven, and the measuring method is abandoned. Various procedures (Fourier transform, maxima analysis and an analysis of the rate of change of sign, etc.) then allow the frequency of the variations in the values measured in step d) to be computed. The computed frequency corresponds to the frequency of rotation of the wheel.

In step f) of the method illustrated in FIG. 4, the acceleration of the pressure sensor is computed by the central unit based on the frequency computed in step e) of the method and on the radius of the pressure sensor with respect to the center of the wheel. It is thus possible to determine the acceleration of the pressure sensor by analyzing the variations in the ratio $P_{MES}/T$.

Figure 5:
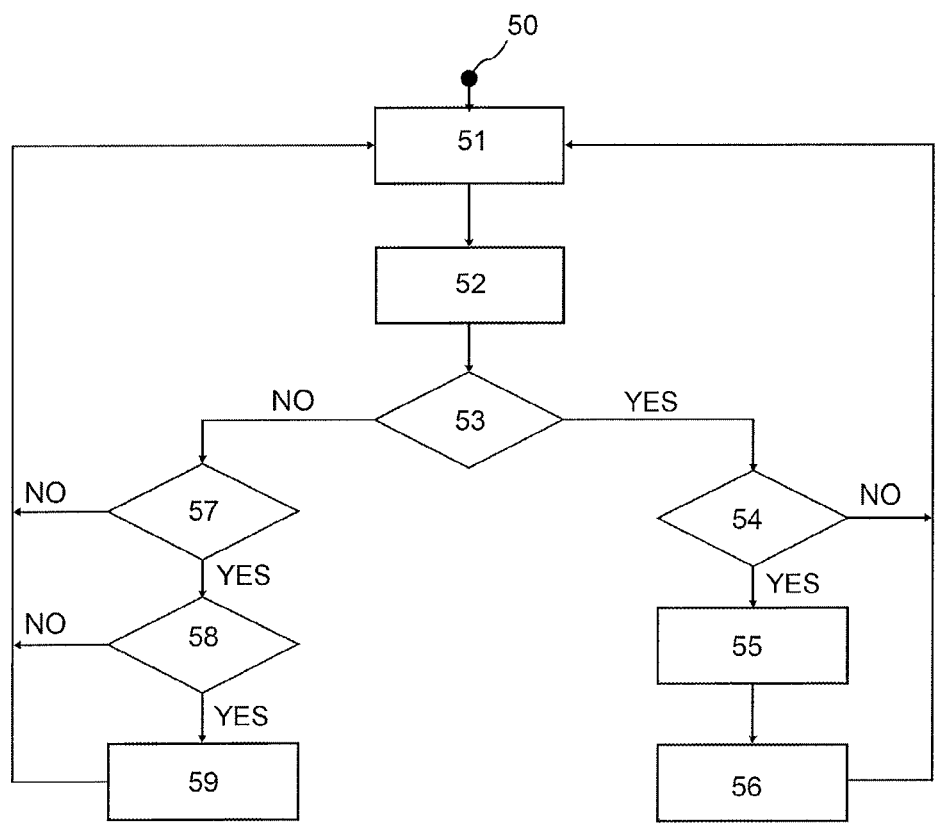
FIG. 5 illustrates one portion of a method for determining the pressure of a tire according to one embodiment of an aspect of the invention.

FIG. 5 illustrates the flow chart of one portion of a method for determining the pressure of a tire according to one embodiment of an aspect of the invention.

State 50 corresponds to a turned-off vehicle. Starting up the vehicle causes passage to the state 51, which corresponds to a waiting or rest state.

In state 51, passage to state 52 occurs automatically, each time a predefined regular period starts or ends.

In state 52, the temperature T is measured, the pressure $P_{MES}$ is measured, the ratio $P_{MES}/T$ is computed and the speed v of the vehicle is measured. Carrying out these tasks leads to passage to state 53.

In state 53, it is determined whether the vehicle is being driven. If the vehicle is being driven, state 54 is passed to, and if the vehicle is stopped state 57 is passed to.

In state 54, the variations in the ratio $P_{MES}/T$ and the temperature are measured. If the ratio and the temperature are sufficiently stable (i.e. the variation as a function of time in the ratio $P_{MES}/T$ is lower than a threshold value, for example lower than $8 \text{ Pa} \cdot K^{-1} \cdot s^{-1}$ and the variation as a function of time in the temperature is lower than a threshold value, for example lower than 1 K·min$^{-1}$), state 55 is passed to. Otherwise, state 51 is passed to.

In state 55, a value of the ratio $P_{MES}/T$ is stored in a ratio library, as is the corresponding speed of the vehicle. In other words, a library of ratios is generated and/or updated. Such storage leads to passage to state 56.

In state 56, the variation law representative of the variation in the ratios is updated, depending on the library updated in state 55. In other words, a new variation law of the ratios is computed taking into account the ratio recorded in state 55. The update of the variation law leads to passage to state 51.

In state 57, it is evaluated whether the vehicle has been parked for a long time, i.e. for example parked for more than 15 minutes. In the case where the vehicle has been parked for a long time, state 58 is passed to. In the contrary case, state 51 is passed to.

In state 58, variations in the ratio $P_{MES}/T$ and the temperature T are measured. If the ratio and the temperature are sufficiently stable (i.e. the norm of the variation as a function of time in the ratio $P_{MES}/T$ is lower than a threshold value, for example lower than 8 Pa·K$^{-1}$·s$^{-1}$ and the norm of the variation as a function of time in the temperature is lower than a threshold value, for example lower than 1 K·min$^{-1}$), state 59 is passed to. Otherwise, state 51 is passed to.

In state 59, a value of the ratio $P_{MES}/T$ corresponding to a zero vehicle speed is recorded in a ratio library. Such storage leads to passage to state 51.

In the embodiment of an aspect of the invention illustrated in FIG. 5, step a) of the method comprises passage through states 51, 52, 53, 54, 55, 57, 58 and 59. Step b) of the method comprises passage through state 56. Step c) of the method is not shown in the flowchart.

The invention claimed is:

1. A method for determining, at a time, a pressure of a tire of a vehicle that is being driven at a speed, the tire comprising, arranged in the tire, a pressure sensor and a temperature sensor, the method comprising:
    a) generating a library of ratios between a measurement of an output of the pressure sensor and a measurement of an output of the temperature sensor, the one or more ratios being calculated at different speeds and one ratio being measured at a speed of zero,
    b) based on the ratios of the library, defining a variation law representative of the variation in the ratios with respect to an acceleration experienced by the pressure sensor,
    c) at the time, measuring the output of the pressure sensor and the output of the temperature sensor, and obtaining the value of the acceleration experienced by the pressure sensor,
        determining the pressure by correcting this measurement with the variation law.

2. The method as claimed in claim 1, wherein, in step a), the library is updated with ratios measured during a first phase of driving and wherein step c) follow steps a) and b).

3. The method as claimed in claim 2, wherein the first phase of driving has a duration of ten minutes.

4. The method as claimed in claim 1, wherein, in step a), a ratio is measured at a speed comprised between 50 km/h and 100 km/h and another ratio is measured at a speed strictly comprised between 100 km/h and 150 km/h.

5. The method as claimed in claim 1, wherein the acceleration of the pressure sensor is obtained in step c) with an accelerometer arranged in the tire.

6. The method as claimed in claim 1, wherein the acceleration of the pressure sensor is obtained in step c) with an element chosen from a speed sensor of a wheel associated with the tire and a GPS system of the vehicle.

7. The method as claimed in claim 1, wherein it is checked that the norm of the variation of a ratio is lower than 8 Pa·K$^{-1}$·s$^{-1}$ before step c).

8. The method as claimed in claim 1, wherein it is checked that the variation in the output of the temperature sensor is comprised between −1 and 1 K·min$^{-1}$ before step c).

9. The method as claimed in claim 1, wherein the value of the acceleration of the pressure sensor is obtained in step c) by:
    d) sampling values of the output of the pressure sensor during a preset period;
    e) determining a frequency of the variations in the values measured in step d);
    f) calculating the acceleration of the pressure sensor depending on the frequency measured in step e) and on the radius between the pressure sensor and the center of the wheel.

10. The method as claimed in claim 9, wherein the frequency is determined in step e) using a method chosen from a Fourier transform, a maxima analysis and an analysis of the rate of change of sign.

* * * * *